US009883166B2

(12) United States Patent
Oh et al.

(10) Patent No.: US 9,883,166 B2
(45) Date of Patent: Jan. 30, 2018

(54) THREE DIMENSIONAL IMAGE PICK-UP DEVICE AND MANUFACTURING METHOD THEREOF

(71) Applicant: LG INNOTEK CO., LTD., Seoul (KR)

(72) Inventors: Sangyun Oh, Seoul (KR); Seongcheol Jeong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 195 days.

(21) Appl. No.: 14/611,375

(22) Filed: Feb. 2, 2015

(65) Prior Publication Data

US 2015/0145967 A1    May 28, 2015

Related U.S. Application Data

(63) Continuation of application No. 13/269,127, filed on Oct. 7, 2011, now Pat. No. 8,964,003.

(30) Foreign Application Priority Data

Oct. 8, 2010   (KR) ........................ 10-2010-0098338

(51) Int. Cl.
*H04N 13/02* (2006.01)
*G03B 35/08* (2006.01)
(Continued)

(52) U.S. Cl.
CPC ... *H04N 13/0239* (2013.01); *B29D 11/00807* (2013.01); *G03B 35/08* (2013.01); *H04N 5/2251* (2013.01); *B29C 65/18* (2013.01); *B29C 65/48* (2013.01); *B29C 65/483* (2013.01); *B29C 66/1122* (2013.01); *B29C 66/54* (2013.01); *B29C 66/7394* (2013.01); *B29C 66/73775* (2013.01); *B29C 66/81431* (2013.01); *B29C 66/8322* (2013.01); *B29L 2031/3425* (2013.01)

(58) Field of Classification Search
CPC ............ H04N 13/0239; H04N 5/2251; B29D 11/00807; G03B 35/08; B29C 66/54; B29C 65/48; B29C 65/483; B29C 66/81431; B29C 65/18; B29C 66/8322; B29C 66/7394; B29C 66/73775; B29C 66/11; B29L 2031/3425
See application file for complete search history.

(56) References Cited

U.S. PATENT DOCUMENTS

| 4,681,987 A | 7/1987 | Suwa |
| 2001/0030682 A1 | 10/2001 | Tserkovnyuk et al. |

(Continued)

FOREIGN PATENT DOCUMENTS

| JP | 11-301365 A | 11/1999 |
| JP | 2000-200870 A | 7/2000 |

(Continued)

OTHER PUBLICATIONS http://www.3dworldshop.com/epages/544034815.sf/en_GB/?ObjectPath=/Shops/544034815/Categories/NEWS.*

*Primary Examiner* — Tung Vo
*Assistant Examiner* — Joseph Becker
(74) *Attorney, Agent, or Firm* — Birch, Stewart, Kolasch & Birch, LLP

(57) ABSTRACT

A 3-D image pick-up device is disclosed, the device including: a PCB mounted with two camera modules including an image sensor; and a reinforcing member mounted with two exposure windows, wherein the PCB and the reinforcing member are mutually adhered to allow the camera modules of the PCB to be exposed through the exposure window of the reinforcing member.

19 Claims, 2 Drawing Sheets

(51) Int. Cl.
    *H04N 5/225*     (2006.01)
    *B29D 11/00*     (2006.01)
    *B29C 65/18*     (2006.01)
    *B29C 65/00*     (2006.01)
    *B29L 31/34*     (2006.01)
    *B29C 65/48*     (2006.01)

(56) References Cited

U.S. PATENT DOCUMENTS

| | | |
|---|---|---|
| 2007/0096234 A1 | 5/2007 | Tanaka et al. |
| 2009/0153985 A1* | 6/2009 | Nagaoka ................ G02B 7/021 |
| | | 359/733 |
| 2010/0007714 A1 | 1/2010 | Kim et al. |
| 2010/0259655 A1 | 10/2010 | Takayama |
| 2010/0324239 A1 | 12/2010 | Matsumoto et al. |
| 2011/0044679 A1 | 2/2011 | Yoshida et al. |
| 2011/0169956 A1 | 7/2011 | DeLine et al. |
| 2011/0171472 A1 | 7/2011 | Husemann et al. |
| 2011/0193480 A1 | 8/2011 | Bauer et al. |
| 2012/0127291 A1 | 5/2012 | Mahoney |
| 2014/0132739 A1 | 5/2014 | Ohsumi et al. |

FOREIGN PATENT DOCUMENTS

| | | |
|---|---|---|
| KR | 10-2007-0047721 A | 5/2007 |
| WO | WO 2006/052024 A1 | 5/2006 |
| WO | WO 2009/057436 A1 | 5/2009 |

\* cited by examiner

THREE DIMENSIONAL IMAGE PICK-UP DEVICE AND MANUFACTURING METHOD THEREOF

This application is a Continuation of co-pending application Ser. No. 13/269,127 filed on Oct. 7, 2011, which claims priority to Korean Patent Application No. 10-2010-0098338, filed on Oct. 8, 2010, the contents of all of the above applications are hereby incorporated by reference.

BACKGROUND OF THE DISCLOSURE

Field

The present disclosure relates to a substrate used for a three-dimensional (3-D) image pick-up device, and more particularly to technique configured to prevent a flexure by reinforcing a substrate used inside a 3-D image pick-up device.

Background

Many attempts have been made to bring a three-dimensional (3-D) viewing experience to film, video, and broadcast displays.

Typically, a 3-D image is perceived by means of stereo vision of two eyes. Binocular disparity, i.e., a disparity caused by two eyes being separated by a distance of about 65 mm, plays a most important role in the stereoscopic effect. That is, when left and right eyes view different 2-D images and the two images are transmitted to the brain through the optic nerves, the brain combines the two images to construct a representation of the original 3-D image that includes depth. Such ability is usually called stereography.

A 3-D image is manufactured using the effect of perceiving the 3-D feeling, and to be more specific, a capturing device equipped with a dual lens system is used to allow each lens to capture an object at a different direction, and the captured images are respectively displayed to enable a manufacturing of the 3-D image.

Recently, concomitant with rapid development of semiconductor technologies, miniaturization of an image sensor is realized, and due to development of manufacturing technologies of PCBs (Printed Circuit Boards), a substrate included with a camera module can become miniaturized and light-weighted. Furthermore, due to miniaturizing and weight-lighting technologies, a mobile device such as a digital camera is made possible to be used as a 3-D image capturing device (image pick-up device).

A conventional PCB including a camera module embedded and used in a 3-D capturing device will be briefly described with reference to FIG. 1.

Referring to FIG. 1, a PCB (20) included with a camera module includes thereon a camera module (10) and a connector (30). The PCB (20) included with the conventional camera module is generated by itself with a flexure or is generated with a flexure when mounted on a 3-D image capturing device (image pick-up device).

In order to embody a 3-D image, a relative position of each camera is important. It is because the 3-D feeing can be changed depending on a relative position of each camera. That is, the flexure of the PCB (20) may change a relative position of a two-camera dual camera module for embodying a 3-D image in the 3-D image capturing device, thereby resulting in a decreased 3-D effect captured and embodied by the dual camera module.

SUMMARY

The present disclosure has been made to solve the foregoing problems of the prior art and therefore an object of certain embodiments of the present disclosure is to provide a structure of a PCB used for a three-dimensional (3-D) image pick-up device to prevent occurrence of flexure in the PCB by coupling a predetermined reinforcing member to the PCB, and a method manufacturing the same.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

In one general aspect of the present disclosure, there is provided a 3-D image pick-up device, comprising: a PCB mounted with two camera modules including an image sensor; and a reinforcing member mounted with two exposure windows, wherein the PCB and the reinforcing member are mutually adhered to allow the camera modules of the PCB to be exposed through the exposure window of the reinforcing member.

Preferably, a lens housing center axis of the camera module is arranged to the front through the exposure window of the reinforcing member.

Preferably, the reinforcing member and the PCB are adhered by a thermosetting epoxy coated on the mutually contacted surface.

Preferably, each of the two camera modules is discrete from the other camera module.

Preferably, a connector unit is mounted at an area of the PCB between the two camera modules.

Preferably, a rib structure is formed between the two camera modules and the connector unit.

Preferably, the reinforcing member is formed with an opening window having an opening at a portion corresponding to the connector unit formed at the PCB.

Preferably, the reinforcing member is formed with a rib structure relative to a remaining area except for the exposure window and the opening window.

Preferably, material of the reinforcing member is thermosetting crystalline polymer.

Preferably, an adhesive is interposed between the exposure window of the reinforcing member and the two camera modules.

Preferably, the PCB is formed with at least one lug, and the reinforcing member is formed with a hole for inserting the lug.

Preferably, the hole is formed adjacent to the exposure window of the reinforcing member.

In another general aspect of the present disclosure, there is provided a method for manufacturing a 3-D image pick-up device, the method comprising: attaching a lens housing to a PCB mounted with an image sensor; coating a thermosetting epoxy on a predetermined contact surface of the PCB; temporarily coupling a reinforcing member formed with an exposure window to the PCB coated with the thermosetting epoxy; arranging the reinforcing member-temporarily coupled PCB to a hot plate; and pressing an upper surface of the reinforcing member for coupling the reinforcing member by curing the thermosetting epoxy.

Preferably, the step of pressing the upper surface of the reinforcing member for coupling the reinforcing member by curing the thermosetting epoxy includes pressing by using a curing jig formed with a concave portion at a portion of the exposure window.

Preferably, a lens housing center axis of the camera module is arranged to the front through the exposure window of the reinforcing member.

Preferably, the two camera modules are discretely formed and a connector unit is mounted at an area of the PCB between the two camera modules.

Preferably, a rib structure is formed between the two camera modules and the connector unit.

Preferably, the reinforcing member is formed with an opening window having an opening at a portion corresponding to a position of the connector unit formed at the PCB.

Preferably, the reinforcing member is formed with a rib structure relative to a remaining area except for the exposure window and the opening window.

Preferably, material of the reinforcing member is thermosetting crystalline polymer.

The structure of a PCB used for a three-dimensional (3-D) image pick-up device to prevent occurrence of flexure in the PCB according to the present disclosure is advantageous in that a reinforcing member is coupled to a PCB to prevent the PCB from flexuring by intrinsic elasticity of the PCB, or when the PCB is mounted to a 3-D image pick-up device, such that prevention of flexuring phenomenon, in which a cubic feeling of 3-D image manufactured by images obtained by two camera modules decreases, can be avoided.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
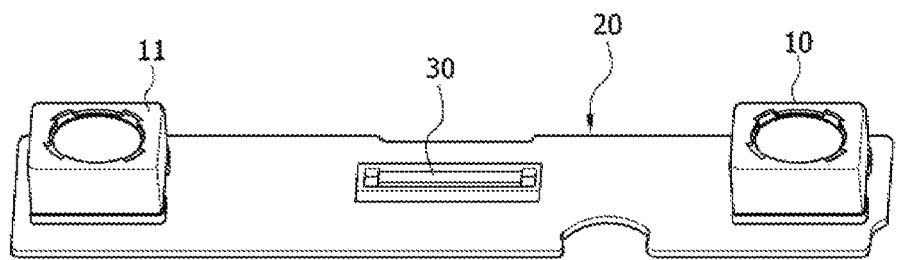
FIG. 1 is a mimetic view illustrating a PCB included with a camera module according to prior art.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity. In other words, it should be noted that the features illustrated in the drawings are not necessarily drawn to scale.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the features illustrated in the drawings are not necessarily drawn to scale. Descriptions of well-known components and processing techniques are omitted so as to not unnecessarily obscure the embodiments of the disclosure.

Hereinafter, a 3-D image pick-up device according to example embodiments will be explained in detail with reference to the accompanying drawings.

Figure 2:
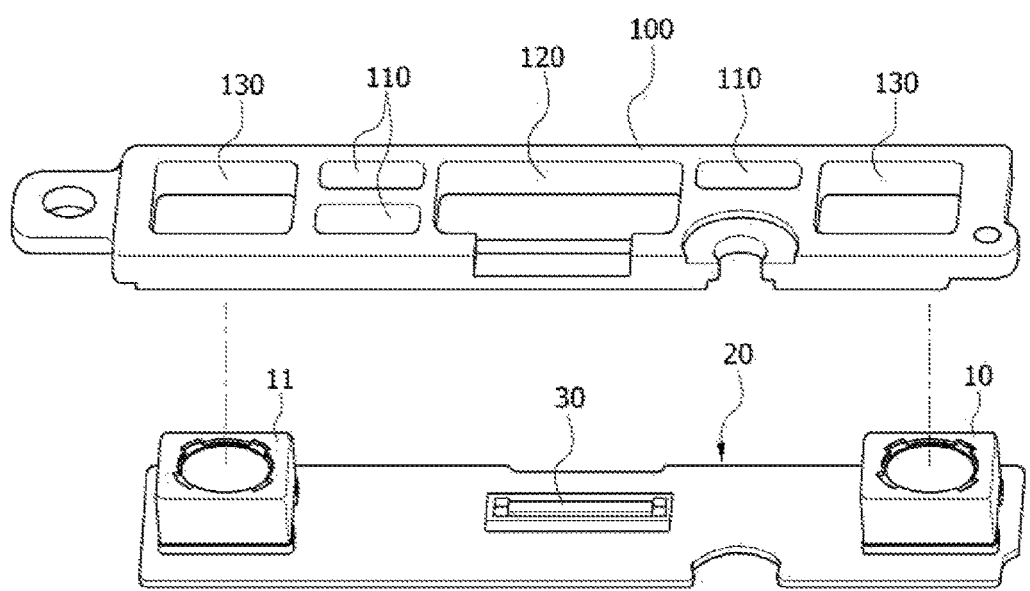
FIG. 2 is an exploded perspective view illustrating a PCB according to an exemplary embodiment of the present disclosure.
Figure 3:
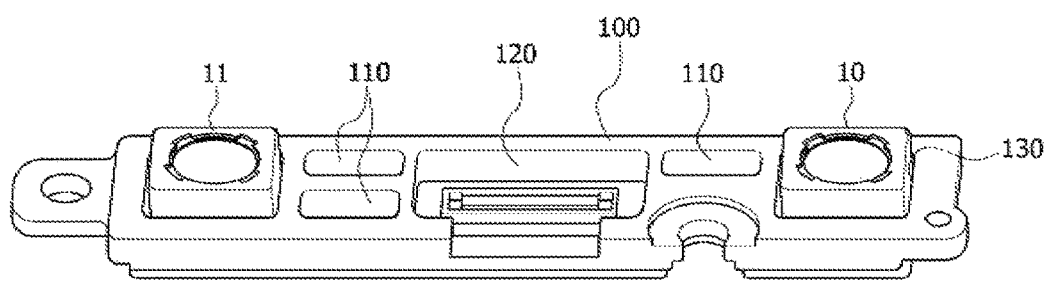
FIG. 3 is a coupled perspective view illustrating a PCB according to an exemplary embodiment of the present disclosure.

FIG. 2 is an exploded perspective view illustrating a PCB according to an exemplary embodiment of the present disclosure, and FIG. 3 is a coupled perspective view illustrating a PCB according to an exemplary embodiment of the present disclosure.

A 3-D image pick-up device illustrated in FIGS. 2 and 3 includes a PCB (20) mounted with two camera modules (10, 11) including an image sensor; and a reinforcing member (100) mounted with two exposure windows (130), wherein the PCB and the reinforcing member (100) are mutually adhered to allow the camera modules (10, 11) of the PCB (20) to be exposed through the exposure window (130) of the reinforcing member (100).

The reinforcing member (100) in FIGS. 2 and 3 is mounted with the exposure windows (130) and an opening window (120), where the exposure window (130) is a device for exposing the camera modules (10, 11) mounted at an upper surface of the PCB (20) to the front when the reinforcing member (100) is coupled to the PCB (20).

Meanwhile, the opening window (120) is a device for exposing a connector unit (30) included on the PCB (20) to the front when the reinforcing member (100) is coupled to the PCB (20).

FIG. 2 shows a state before the PCB (20) mounted with the two camera modules (10, 11) is coupled to the reinforcing member (100). To be more specific, the PCB (20) mounted with the two camera modules (10, 11) and the reinforcing member (100) are arranged such that a lens housing center axis of the camera modules (10, 11)) is arranged to the front through the exposure window of the reinforcing member.

Furthermore, each of the two camera modules (10, 11) may be discrete from the other camera module and a connector unit (30) may be mounted at an area of the PCB (20) between the two camera modules (10, 11). Still furthermore, a rib structure (110) may be formed between the two camera modules (10, 11) and the connector unit (30).

FIG. 3 shows a state where the PCB (20) mounted with the two camera modules (10, 11) is coupled to the reinforcing member (100), where a thermosetting epoxy is used for coupling the PCB (20) mounted with the two camera modules (10, 11) to the reinforcing member (100).

A big difference from the PCB (20) included with camera modules according to the prior art is that the PCB (20) included with the two camera modules (10, 11) is coupled thereon by the reinforcing member (100).

As illustrated in FIG. 1, in a case the PCB (20) included with camera modules (10, 11) is not coupled with the reinforcing member (110) according to the prior art, a flexuring phenomenon is generated, whereas in a case the PCB (20) included with camera modules (10, 11) is coupled to the reinforcing member (110) according to the exemplary embodiment of the present disclosure, there is an effect of maximally preventing the generation of flexure through a robust reinforced structure of the PCB (20) included with camera modules (10, 11).

Furthermore, an adhesive may be interposed between the exposure window (130) of the reinforcing member (100) and the two camera modules (10, 11). Still furthermore, the PCB (20) may be formed with at least one lug, and the reinforcing member may be formed with a hole for inserting the lug. The hole may be formed adjacent to the exposure window of the reinforcing member.

The reinforcing member (100) illustrated in FIGS. 2 and 3 may be preferably formed with a rib structure relative to a remaining area except for the exposure window (130) and the opening window (120) to reduce a dead mass and to prevent deformation of the reinforcing member. The window formed for reducing the 'fat' is defined as a fat-reducing window.

The rib structure is designed to form the reinforcing member (100), where the rib structure may be a groove or a hole formed on the reinforcing member (100).

Preferably, the reinforcing member is used with a material with a high elasticity, and a material having the high elasticity includes a thermosetting crystalline polymer.

Now, a method for manufacturing a 3-D image pick-up device will be described.

The method for manufacturing the 3-D image pick-up device may include: attaching a lens housing to a PCB mounted with an image sensor; coating a thermosetting epoxy on a predetermined contact surface of the PCB; temporarily coupling a reinforcing member (100) formed with an exposure window to the PCB coated with the thermosetting epoxy; arranging the reinforcing member-temporarily coupled PCB to a hot plate (150); and pressing an upper surface of the reinforcing member for coupling the reinforcing member by curing the thermosetting epoxy.

Figure 4:
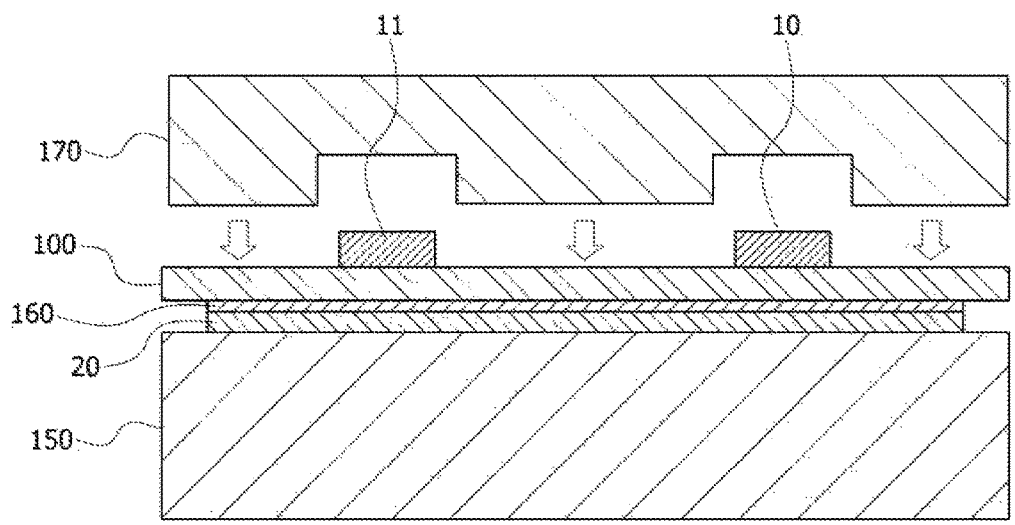
FIG. 4 is a mimetic view illustrating a method of coupling a reinforcing member to a PCB included with a camera module using a curing jig according to an exemplary embodiment of the present disclosure.

FIG. 4 is a mimetic view illustrating a method of coupling a reinforcing member to a PCB (20) included with camera modules using a curing jig (170) according to an exemplary embodiment of the present disclosure.

Preferably, the step of pressing the upper surface of the reinforcing member for coupling the reinforcing member by curing the thermosetting epoxy includes pressing by using the curing jig (170) formed with a concave portion at a portion of the exposure window.

As apparent from the foregoing, the structure of a PCB used for a three-dimensional (3-D) image pick-up device to prevent occurrence of flexure in the PCB according to the present disclosure has an industrial applicability in that a reinforcing member is coupled to a PCB to prevent the PCB from flexuring by intrinsic elasticity of the PCB, or when the PCB is mounted to a 3-D image pick-up device, such that prevention of flexuring phenomenon, in which a cubic feeling of 3-D image manufactured by images obtained by two camera modules decreases, can be avoided.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A 3-D image pick-up device, comprising:
a PCB (Printed Circuit Board);
two camera modules, the two camera modules disposed on an upper surface of the PCB;
a reinforcing member comprising two exposure windows disposed at positions corresponding with that of the two camera modules, the reinforcing member coupled to the upper surface of the PCB; and
at least one rib disposed on the reinforcing member and spaced apart from the two exposure windows,
wherein the two camera modules comprise a first camera module and a second camera module spaced apart from each other,
wherein the reinforcing member is configured to prevent the PCB from being bent, wherein a distance from the upper surface of the PCB to an upper surface of each of the two camera modules is longer than a distance from the upper surface of the PCB to an upper surface of the reinforcing member so that a first portion of a lateral surface of the first camera module is exposed outside the reinforcing member, and a second portion of a lateral surface of the second camera module is exposed outside the reinforcing member, wherein the first portion of the first camera module is parallel with the second portion of the second camera module, and wherein the first portion of the first camera module faces the second portion of the second camera module.

2. The 3-D image pick-up device of claim 1, wherein a lens housing center axis of each camera module is arranged to the front through the corresponding exposure window of the reinforcing member.

3. The 3-D image pick-up device of claim 1, wherein the reinforcing member and the PCB are adhered by a thermosetting epoxy coated on the mutually contacted surface.

4. The 3-D image pick-up device of claim 1, wherein the rib is a groove or a hole.

5. The 3-D image pick-up device of claim 1, wherein material of the reinforcing member is thermosetting crystalline polymer.

6. The 3-D image pick-up device of claim 1, wherein an adhesive is interposed between the exposure windows of the reinforcing member and the two camera modules.

7. The 3-D image pick-up device of claim 1, wherein the PCB is formed with at least one lug, and the reinforcing member is formed with a hole for inserting the lug.

8. The 3-D image pick-up device of claim 7, wherein the hole is formed adjacent to the exposure windows of the reinforcing member.

9. The 3-D image pick-up device of claim 1, wherein the first portion of the first camera module has an area corresponding with that of the second portion of the second camera module.

10. A 3-D image pick-up device, comprising:
a PCB (Printed Circuit Board);
two camera modules, the two camera modules discretely disposed on an upper surface of the PCB;
a reinforcing member comprising two exposure windows correspondingly formed at positions of the two camera modules, the reinforcing member coupled to the upper surface of the PCB;
at least one rib formed between the two exposure windows; and
a connector unit disposed on the upper surface of the PCB,
wherein the two camera modules comprises a first camera module and a second camera module spaced apart from each other,
wherein the reinforcing member further comprises an opening disposed at a portion corresponding to a position of the connector unit disposed on the PCB,
wherein a distance from the upper surface of the PCB to an upper surface of each of the two camera modules is longer than a distance from the upper surface of the PCB to an upper surface of the reinforcing member so that a first portion of a lateral surface of the first camera module is exposed outside the reinforcing member and a second portion of a lateral surface of the second camera module is exposed outside the reinforcing member, wherein the first portion of the first camera module is parallel with the second portion of the second camera module, and wherein the first portion of the first camera module faces the second portion of the second camera module.

11. The 3-D image pick-up device of claim 10, further comprising a rib formed between the two camera modules and the connector unit.

12. The 3-D image pick-up device of claim 11, wherein the rib is formed at a remaining area except for the exposure window and the opening.

13. A method for manufacturing a 3-D image pick-up device, the method comprising:
attaching two camera modules, each camera module including an image sensor, to a PCB (Printed Circuit Board);
coating a thermosetting epoxy on a predetermined surface of the PCB;
temporarily coupling a reinforcing member formed with an exposure window to the PCB coated with the thermosetting epoxy;
arranging the reinforcing member temporarily coupled PCB to a hot plate, the reinforcing member including two exposure windows correspondingly formed at positions of the two camera modules and at least one rib formed between the two exposure windows, and the reinforcing member being coupled to an upper surface of the PCB to prevent the PCB from being bent; and
pressing an upper surface of the reinforcing member for coupling the reinforcing member by curing the thermosetting epoxy,
wherein the two camera modules are discretely formed and a connector unit is mounted at an area of the PCB,
wherein the reinforcing member is formed with an opening at a portion corresponding to a position of the connector unit mounted at the PCB, and
wherein a distance from the upper surface of the PCB to an upper surface of each of the two camera modules is longer than a distance from the upper surface of the PCB to an upper surface of the reinforcing member so that a portion of a lateral surface of each of the two camera modules is exposed outside the reinforcing member.

14. The method of claim 13, wherein the pressing the upper surface of the reinforcing member for coupling the reinforcing member by curing the thermosetting epoxy includes pressing by using a curing jig formed with a concave portion at a portion of the exposure window.

15. The method of claim 13, wherein a lens housing center axis of each camera module is arranged to the front through the corresponding exposure window of the reinforcing member.

16. The method of claim 13, wherein a rib is formed between the two camera modules and the connector unit.

17. The method of claim 16, wherein the rib is formed at a remaining area except for the exposure window and the opening window.

18. The method of claim 13, wherein material of the reinforcing member is thermosetting crystalline polymer.

19. The method of claim 13, wherein the two camera modules comprise a first camera module and a second camera module spaced apart from each other,
wherein a first portion of a lateral surface of the first camera module is exposed outside the reinforcing member and a second portion of a lateral surface of the second camera module is exposed outside the reinforcing member, wherein the first portion of the first camera module is parallel with the second portion of the second camera module, and wherein the first portion of the first camera module faces the second portion of the second camera module.

\* \* \* \* \*